United States Patent [19]

Lidgitt et al.

[11] Patent Number: 5,006,232

[45] Date of Patent: Apr. 9, 1991

[54] SEWAGE TREATMENT PLANT

[75] Inventors: Peter J. Lidgitt; Derek J. Freeman, both of Trowbridge; Paul F. Cooper, Stevenage, all of Great Britain

[73] Assignee: The Secretary of State for Defence, in Her Britannic Majesty's Government of the United Kingdom of Great Britain and Northern Ireland, London, England

[21] Appl. No.: 458,618

[22] PCT Filed: Jun. 2, 1988

[86] PCT No.: PCT/GB88/00434

§ 371 Date: Jan. 22, 1990

§ 102(e) Date: Jan. 22, 1990

[87] PCT Pub. No.: WO88/09740

PCT Pub. Date: Dec. 15, 1988

[30] Foreign Application Priority Data

Jun. 5, 1987 [GB] United Kingdom ............... 8713211

[51] Int. Cl.⁵ ............................................. C02F 3/20
[52] U.S. Cl. ................................. 210/96.1; 210/104; 210/143; 210/202; 210/220; 210/258; 210/259
[58] Field of Search ............... 210/96.1, 104, 138, 210/143, 195.1, 195.3, 202, 220, 258, 259, 626

[56] References Cited

U.S. PATENT DOCUMENTS

| | | | |
|---|---|---|---|
| 3,355,019 | 11/1967 | Mitchell | 210/104 |
| 3,522,881 | 8/1970 | Nicol | 210/220 |
| 3,552,554 | 1/1971 | Olgard | 210/521 |
| 3,679,053 | 7/1972 | Koulovatos et al. | 210/104 |
| 3,844,946 | 10/1974 | Farrell, Jr. | 210/195.1 |
| 3,920,550 | 11/1975 | Farrell, Jr. et al. | 210/96.1 |
| 3,950,249 | 4/1976 | Eger et al. | 210/138 |
| 4,009,104 | 2/1977 | Behrendt et al. | 210/104 |
| 4,122,013 | 10/1978 | Greenleaf, Jr. et al. | 210/195 |
| 4,211,645 | 7/1980 | Zajic et al. | 210/626 |
| 4,622,134 | 11/1986 | Kobayashi | 210/195.3 |

FOREIGN PATENT DOCUMENTS

| | | |
|---|---|---|
| 3145797 | 5/1983 | Fed. Rep. of Germany. |
| 2454428 | 4/1980 | France. |
| 1525115 | 9/1978 | United Kingdom. |
| 1540168 | 2/1979 | United Kingdom. |

OTHER PUBLICATIONS

Melcer et al, "Conversion of Small Municipal Wastewater Treatment Plants to Sequencing Batch Reactors", JWPCF, vol. 59, No. 2, 2/87, pp. 79-85.
Storch, "Sewage Disposal", Shipping World & Shipbuilder, 9/72, pp. 1073, 1074 and 1093.

*Primary Examiner*—Stanley Silverman
*Assistant Examiner*—Christopher Upton
*Attorney, Agent, or Firm*—Nixon & Vanderhye

[57] ABSTRACT

A sewage treatment plant for use aboard ship comprises a vacuum assisted fresh water flush system delivering sewage to a collection tank. Sewage is collected from the collection tank in batches for treatment. The sewage first enters a settlement tank and is then transferred to an aeration tank. After aeration, treated sewage is then transferred out in batches. The batch processing overcomes the difficulties of operating a continuous flow arrangement on a moving platform where liquid can move back and forth, which presents difficulties in controlling the level of biological activity. A controlled amount of sewage transferred to the aeration tank is diluted with grey water. A sludge storage tank is provided and suspended solids probes are provided in the aeration and settlement tanks such that sludge is automatically withdrawn from these tanks to the storage tank to maintain the level of suspended solids within predetermined limits. The sludge storage tank is provided with aerators and its temperature is controlled such that aerobic digestion renders the sludge inert. Small batches of aerated liquid are drawn from the aeration tank into a chlorination tank via a separation system at controlled intervals between successive sewage batch transfers from the collection tank to the aeration tank via the settling tank prior to discharge from the plant.

11 Claims, 1 Drawing Sheet

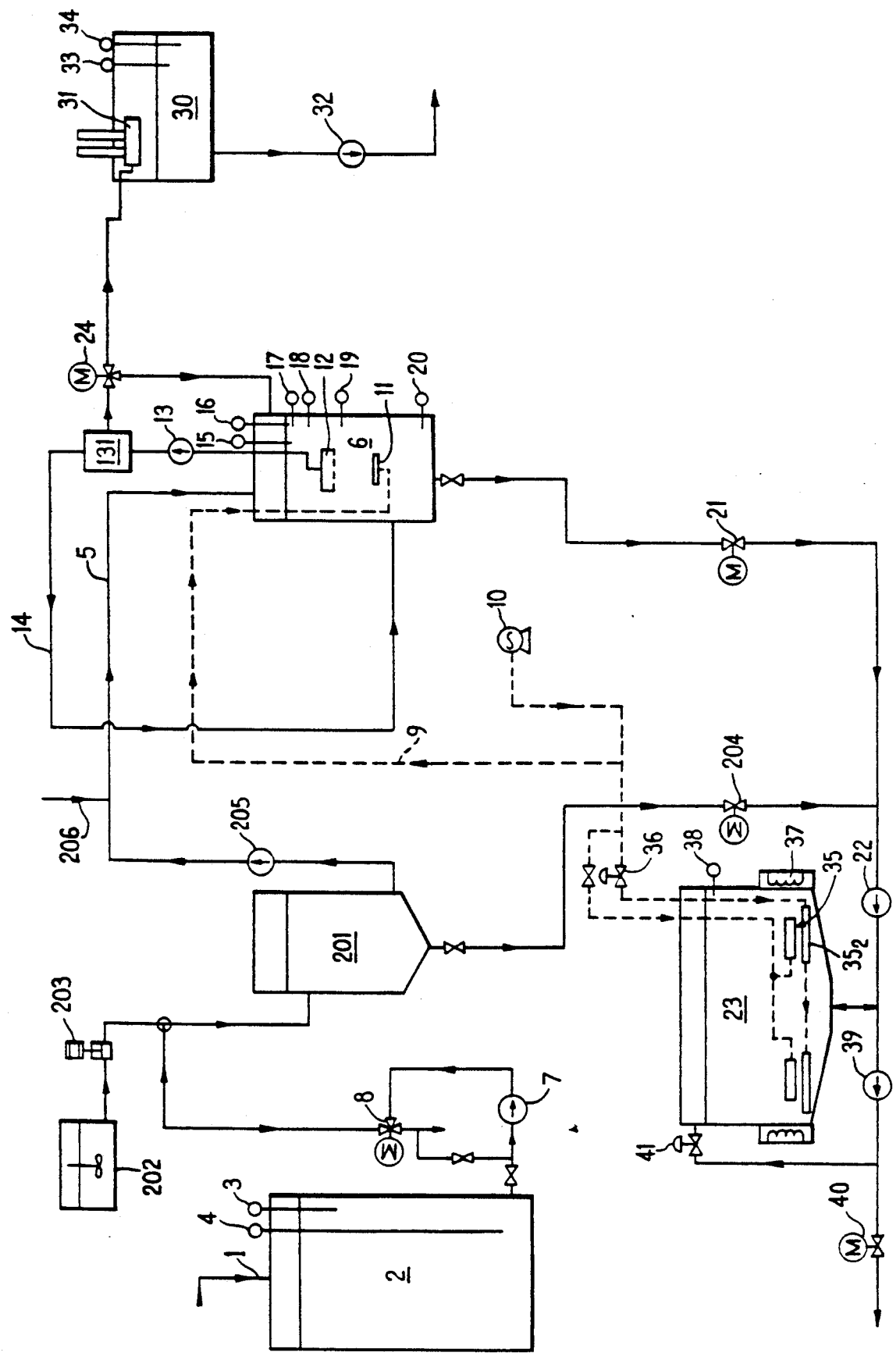

SEWAGE TREATMENT PLANT

BACKGROUND OF THE INVENTION

1. Field of the Invention

The invention relates to the treatment of sewage and in particular, though not exclusively, to sewage treatment for use on a mobile platform such as a ship.

2. Discussion of Prior Art

Disposal of sewage from ships alongside or in coastal waters is a considerable current problem. Some harbours have sewage collection facilities, however, these are not always available. Thus sewage collection and treatment plant is required where port facilities are unavailable. Such plant is desirably highly efficient such that a small plant will allow a ship to remain alongside for a long period. Currently there are three types of sewage treatment plant in common use. These are:

(a) Collect, hold and transfer (CHT) with either gravity or vacuum collection systems.
(b) Solid separation treatment plant (SSTPS).
(c) Biological sewage treatment plants (BSTPS).

Biological Sewage Treatment Plants

Theoretically, this type of plant should allow ships to operate for long periods without the need for shore reception facilities. In practice they have not operated satisfactorily for the following reasons:

(a) The process depends upon effective reduction of the sewage by bacteria in the main aeration tank. This process is very sensitive to:
 (1) Changes in the salinity of the flush water.
 (2) High hydraulic loads caused by defective toilet flushing valves or leaking tank cleaning spray cross connection valves.
 (3) Variations in the load cycle imposed by the operating pattern of the ship. Low loads are particularly detrimental as the bacterial population necessary for aerobic digestion of the sewage cannot be sustained.
 (4) Excessive use of detergents and cleaning agents which destroy the bacterial population.
(b) Being continuous flow processes there is no control over the residence time in each tank. This can result in incomplete processing of the sewage and carry over of solids.
(c) Ship motions affect the settling process.

Solid Separation Treatment Plants

This type of plant has the advantage that it is available on demand and can be shut down when the ship is outside controlled waters. However, these plants have not been entirely satisfactory in service for the following reasons:

(a) The level of biological activity of the discharge does not meet the standard expected to be set by international regulations.
(b) The filters have proved to be particularly troublesome. They block frequently and require considerable and unpleasant maintenance.
(c) The plants have a relatively short holding time of only 5–7 days.
(d) The plants use a lot of disinfectant (151 lbs/day).

Collect, Hold and Transfer Systems

The majority of these fitted in the Royal Navy are of the gravity collect type and are fitted to smaller ships. Gravity collection reduces the plant size since flush water is minimised.

The main problem with CHT systems is their limited hold time of 5–7 days. This in turn leads to the requirement for costly sewage reception facilities in the Naval Bases and can lead to problems when ships visit or operate in clean areas.

SUMMARY OF THE INVENTION

The object of the present invention is to provide an improved sewage treatment plant, capable of operation on a mobile platform and of use for longer periods than currently available plant.

The invention provides a sewage treatment plant comprising a collection tank, a settlement tank, an aeration tank, transfer means and a transfer controller arranged such that sewage is transferred in controlled batches into the aeration tank and subsequently out after separation of solids whereby processing can be accurately controlled.

Advantageously a fresh water flush vacuum system is used to collect sewage in the collection tank. The use of a small amount of fresh water, vacuum-assisted, eliminates difficulties experienced with the use of sea water of varying salinity. The batch processing overcomes the difficulties of operating a continuous flow arrangement on a moving platform where liquid can move back and forth. Known biological settling systems operate effectively only under static conditions because of difficulties in controlling the level of biological activity. In the present invention, a controlled amount of sewage is transferred to the aeration tank via a grey water dillution system for a controlled period before separation of the solids transfer from the aeration tank.

The settlment tank is provided between the collection tank and the aeration tank whereby sludge may be removed prior to aeration treatment and dillution with the grey water.

Advantageously a sludge storage tank is provided and suspended solids density probes are provided in the aeration and settlment tanks such that sludge is automatically withdrawn from the aeration tank to the storage tank to maintain the level of suspended solids within a predetermined limit. The sludge storage tank is provided with aerators and its temperature is controlled such that aerobic digestion renders the sludge inert.

Advantageously the controller and transfer means are arranged such that small batches of the liquid are drawn from the aeration tank into a chlorination tank via a separation system at controlled intervals between successive sewage batch transfers from the collection tank to the aeration tank via the settling tank. The separation system advantageously comprises a separator selected from the group of tilted plate separators, air floation and centrifuge.

The arrangement is controlled such that a batch of liquid is transferred from the vacuum separation tank to the chlorination tank prior to entry of fresh liquid to the separation tank.

BRIEF DESCRIPTION OF THE DRAWING

The invention will now be described by way of example only with reference to the accompanying Drawings which shows a flow diagram of a sewage treatment plant according to the invention.

DETAILED DISCUSSION OF PREFERRED EMBODIMENTS

In a marine sewage treatment plant as shown in the FIGURE, sewage collected under vacuum is delivered via a conduit 1 to a 2000 liter sewage reception tank 2, a capacity equivalent to about twice the expected daily sewage collection for a hundred man plant. Fresh water is used for flushing. Vacuum collection requires much less volume of flush water and so leads to a more compact treatment plant than using conventional flush arrangements. Two level probes 3 and 4 in the sewage reception tank 2 define the upper and lower limits for storage of sewage.

Six hourly batches of sewage (250 liters) from the reception tank 2 are first passed via a pump and macerator 7 and a motorised valve 8 to a settlment tank 201 where they are mixed with quantities of settling agent from a polyelectrolyte tank 202 by a pump dispenser 203. Sludge from the settlement tank 201 is transferred through valve 204, together with the sludge from an aeration tank 6, to a sludge storage tank 23. At six hourly intervals liquid remaining (200 liters) in the settlement tank 201 is transferred via line 5 by pump 205 to the 10,000 liters aeration tank 6. Thus bulk solids are removed from the settlment tank 201 prior to aeration treatment. The sewage effluent to be treated in the aeration tank is dilluted with grey water in the ratio 15 parts of water to 1 part of sewage in order to optimise the biological process. Grey water is waste water which is not classified as sewage from e.g. showers, washing and the ship's galley. The grey water is connected to the sewage line 5 via a conduit 206. Every six hours a 250 liter batch is pumped along the line 5 to the aeration tank 6.

Conditions in the aeration tank 6 are critical and these are monitored by various probes 15–20 which measure temperature (15), dissolved oxygen (16), liquid levels (17–19) and suspended solids (20). When the level of suspended solids reaches a critical value, sludge is automatically withdrawn through valve 21 from the base of the aeration tank 6 by a pump 22 to an aerobic sludge digestion/storage tank 23. The sewage is aerated by air provided to fine bubble aerators 11 via air line 9 from a blower 10.

After an initial period 200 liter batches of well aerated liquid are withdrawn hourly from the aeration tank 6 through a suction head 12 by a pump 13 through the separation system 131 and a valve 24 to a chlorination tank 30. The separation system 131 comprises a centrifuge separator although tilted plate separators or an air floatation separator may be used. Between batches the flow from the separation system 131 is diverted by valve 24 back to the aeration tank. Solids are returned from the separation system 131 via line 14 to the aeration tank 6. The aerated liquid batches are transferred to the chlorination tank 30 through a chlorination unit 31. The liquid remains in the chlorination tank 30 for four hours to ensure complete chlorination before it is discharged in 200 liter batches from the ship by means of a pump 32. The liquid level in the chlorination tank 30 is monitored by level probes 33 and 34.

Sludge which is transferred to the sludge storage tank 23 is aerated by aerators 35 (35 and $35_2$) connected via valve 36 to the blower 10. The aerators $35_2$ are fine bubble aerators. The sludge is kept at a controlled temperature by means of a heater 37 and temperature probe 38. In order to prevent build-up of foam within the sludge tank 23 a fine spray of liquid is injected via valve 41 into the top of the sludge tank 23 at predetermined times. After 20 days of storage treatment there remains an inert bulk of material in the sludge tank 23. The 20 days storage defines the maximum endurance of the ship's sewage treatment plant after which the inert sludge is discharged from the sludge tank via pump 39 and valve 40.

In the present invention by keeping the density of suspended solids in the aeration tank 6 to a predetermined maximum, filtering of the liquid after carbonaceous oxidation/nitrification processing is optimised.

We claim:

1. An aerobic sewage treatment plant comprising:
   a vacuum flush system;
   a sewage collection tank, connected to the vacuum flush system, for receiving sewage therefrom;
   a settlement tank, connected so as to receive liquid sewage output from said collection tank, said settlement tank having a liquid sewage outlet and a settled solids outlet;
   a water dilution means, connected to said liquid sewage outlet of the settlement tank, for diluting liquid sewage and for optimizing subsequent biological processing;
   an aeration tank, connected to receive diluted liquid sewage from the settlement tank, said aeration tank having a sewage outlet and a sludge deposit outlet;
   a sludge monitor, connected to the aeration tank, for providing a signal for controlling release of sludge;
   transfer pump means for controllably pumping liquid sewage output from said sewage collection tank to said settlement tank, for controllably pumping liquid sewage from said settlement tank to said water dilution means, for controllably pumping diluted liquid sewage from said water dilution means to said aeration tank, for pumping said sewage from said aeration tank sewage outlet and sludge deposits from said aeration tank sludge deposit outlet, in response to and under the control of a transfer controller; and
   a transfer controller, responsive to at least to said sludge monitor signal, for enabling said transfer pump means to pump between said sewage collection tank, said settlement tank, said water dilution means, said aeration tank and remove material from said aeration tank in controlled batches.

2. A sewage treatment plant as claimed in claim 1 wherein said vacuum flush system includes a fresh water flush vacuum system for collecting sewage in the collection tank.

3. A sewage treatment plant as claimed in claim 1 wherein said water dilution means dilutes the sewage with grey water in the ratio of 15:1.

4. A sewage treatment plant as claimed in claim 3 wherein the sludge storage tank is provided with a liquid spray, operation of which inhibits the build up of foam above the sludge.

5. A sewage treatment plant as claimed 1 further including:
   a sludge storage tank with an input from said aeration tank; and
   wherein the sludge monitor is a suspended solids density probe, and wherein said controller, in response to said probe, controls said transfer pump to transfer sludge from the aeration tank to the storage tank and thereby maintain the level of suspended solids within a predetermined limit.

6. A sewage treatment plant as claimed in claim 5 wherein a discharge means is connected to the sludge storage tank whereby inert sludge is discharged from the sludge storage tank.

7. A sewage treatment plant as claimed in claim 1 wherein the sludge storage tank is provided with aerators and its temperature is controlled such that aerobic digestion renders the sludge inert.

8. A sewage treatment plant as claimed in claim 1 wherein the aeration tank is provided with monitoring and controlling means to maintain liquid level, temperature and dissolved oxygen content of the sewage within predetermined limits.

9. A sewage treatment plant as claimed in claim 1 wherein a suspended solids probe is provided in said settlement tank such that sludge is automatically withdrawn from the settlement tank to a storage tank prior to aeration to maintain the level of suspended solids within predetermined limits.

10. A sewage treatment plant as claimed in claim 1, further including a chlorination tank, connected to the sewage outlet of said aeration tank and said transfer pump means includes means for controllable transferring batches of sewage from said aeration tank to said chlorination tank through a separation means at controlled intervals between successive liquid sewage batch transfers from said settlement tank to said aeration tank.

11. A sewage treatment plant as claimed in claim 10 wherein the separation system comprises a centriguge.

* * * * *